United States Patent
Beeman

[11] Patent Number: 6,144,734
[45] Date of Patent: Nov. 7, 2000

[54] LOW-PASS FILTERS FOR SPLITTERLESS POTS AND DATA TRANSMISSION

[75] Inventor: Robert H. Beeman, Coral Springs, Fla.

[73] Assignee: Siemens Information and Communication Networks, Inc., Boca Raton, Fla.

[21] Appl. No.: 09/107,313

[22] Filed: Jun. 30, 1998

Related U.S. Application Data

[60] Provisional application No. 60/081,660, Apr. 14, 1998.
[51] Int. Cl.[7] .......................... H04M 9/00; H04M 11/00
[52] U.S. Cl. .......................................... 379/398; 379/93.09
[58] Field of Search .............................. 379/93.01, 93.05, 379/93.08, 93.09, 93.33, 184, 194, 387, 397–400, 416; 370/468, 493–497; 375/350; 333/17.1, 201–202

[56] References Cited

U.S. PATENT DOCUMENTS

| | | | |
|---|---|---|---|
| 5,623,543 | 4/1997 | Cook | 379/398 |
| 5,841,841 | 11/1998 | Dodds et al. | 379/93.08 |
| 5,848,150 | 12/1998 | Bingel | 379/93.09 |

*Primary Examiner*—Huyen Le
*Assistant Examiner*—George Eng
*Attorney, Agent, or Firm*—Joseph S. Codispoti

[57] ABSTRACT

A transmission system includes a transmission path from a transmitting station to a receiving station for both voice telephone service occupying the frequency spectrum below a predetermined frequency $f_1$ and for data service occupying the frequency spectrum above another predetermined frequency $f_3$, where $f_3$ is substantially higher than $f_1$, a plurality of telephone sets at said receiving station connected in parallel with one another to the transmission path, and where each of the telephone sets has an on-hook state which presents a substantially infinite resistance to the transmission path and an off-hook state which presents a predetermined resistance R to the transmission path. A plurality of separate and substantially identical multi-pole low-pass filters are provided for connection between the transmission path and respective ones of the telephone sets, where each of the low-pass filters has a −3 dB frequency $f_2$ which lies between $f_1$ and $f_3$, and a characteristic impedance of substantially (n*R), where n is a number equal to at least 2.4, thereby reducing the effect of low impedances that develop at frequencies below $f_1$ because of resonances that occur between $f_1$ and $f_2$ with at least one but less than all of said telephone sets off-hook.

19 Claims, 4 Drawing Sheets

LOW-PASS FILTERS FOR SPLITTERLESS POTS AND DATA TRANSMISSION

REFERENCE TO RELATED APPLICATION AND PRIORITY CLAIM

This application expressly claims the benefit of earlier filing date and right of priority from the following co-pending patent application: U.S. Provisional application Ser. No. 60/081,660 (Attorney Docket 98 P 7499 US) filed on Apr. 14, 1998 in the name of Beeman entitled "Pots Filters For ADSL Splitterless Transmission" of which provisional patent application is expressly incorporated in its entirety by reference.

FIELD OF THE INVENTION

This invention relates generally to low-pass filters and, more particularly, to low-pass filters for use in telecommunication systems which carry both voice (Plain Old Telephone Service or POTS) and data messages in separate parts of a shared frequency spectrum.

BACKGROUND OF THE INVENTION

One type of telecommunication system used between a telephone company office and the premises of telephone subscriber, in what has traditionally been described as the "subscriber loop" plant, combines voice and data message transmission over a single metallic pair of wires by using the lowest portion or band of the system's frequency spectrum, up to a frequency $f_1$ (typically 4 kHz), for voice and the highest portion or band of the system's frequency spectrum, above a frequency $f_3$ (typically 24 kHz) for data. With such a system, it is no longer necessary to install an additional pair of wires in order to add high speed data service for an existing POTS subscriber. In the past, interference between the voice and data bands in such systems has been avoided by installing a device known as a "POTS splitter" at a point where the metallic pair from the telephone company office enters the subscriber premises. The splitter is a passive filter-type device which sends frequencies below an intermediate frequency $f_2$ (typically 10 kHz) to interior POTS wiring and frequencies above $f_2$ to interior data wiring. With such an arrangement, the data signals, which exist almost entirely above $f_3$, do not appear at and are not affected by POTS telephone receivers and the POTS signals, which only use frequencies below $f_1$, do not appear at and are not affected by data modem (modulator-demodulator) signals.

Installation of a POTS splitter at the subscriber premises is a labor intensive activity which requires the telephone company to dispatch a technician and a vehicle to the subscriber premises to do the work, creating both an extra expense and a possible barrier to the provision of data service. One way of addressing this problem might be simply to provide low-pass filters (with −3 dB frequencies of substantially $f_2$) that can easily be obtained by subscribers themselves and installed by them at each of their own telephone receivers. In such an arrangement, both the data modem and the POTS telephones would receive signals from the same pair of wires entering the subscriber premises from the telephone company office, with no need for either a POTS splitter or even separate inside wiring for the data service.

Unfortunately, such use of low-pass filters also creates problems when the subscriber has more than one POTS telephone set connected across the incoming line. In the telephone loop plant, low-pass filters intended to pass voice frequency signals are normally designed to have characteristic impedances substantially matching the impedance R (approximately 600 ohms resistance) of an off-hook telephone receiver. In that way, reflections are minimized and transmission conditions are generally optimum. An on-hook telephone set presents a substantially infinite impedance to the filter, but that is no problem as long as there is only one telephone set connected across the incoming line. The low-pass filter performs in the manner for which it was designed when the telephone set is off-hook and any consequences of an impedance mismatch when the telephone set is on-hook are of no significance. When there are multiple telephone sets, however, filter performance is degraded drastically unless all telephone sets are off-hook at the same time. If less than all telephone sets are off-hook, because any filters connected to on-hook telephone sets are terminated in substantially infinite impedances, such filters are connected effectively in parallel with filters connected to off-hook telephone sets. Low impedances then develop at frequencies below $f_1$ because of resonances that occur between $f_1$ and $f_2$, making the arrangement essentially unusable.

SUMMARY OF THE INVENTION

The present invention solves both the problems presented by the use of POTS splitters and the problems presented by the use of low-pass filters at each of the subscriber telephone sets. From one important aspect, the invention involves intentionally mismatching low-pass filters connected between the incoming transmission path and each of multiple telephone sets on the subscriber premises. Instead of designing the low-pass filters between the incoming transmission path and individual telephone sets to have a characteristic impedance of R, they are designed instead to have characteristic impedances of (2.4*R) or greater.

The context of the invention is a transmission system which includes a transmission path from a transmitting station to a receiving station for both voice telephone service occupying the frequency spectrum below a predetermined frequency $f_1$ (typically 4 kHz) and for data service occupying the frequency spectrum above another predetermined frequency $f_3$ (typically 24 kHz), where $f_3$ is substantially higher than $f_1$. In such a system, a plurality of telephone sets at the receiving station are connected in parallel with one another to the transmission path, where each of the telephone sets has an on-hook state which presents a substantially infinite resistance to the transmission path and each of the telephone sets has an off-hook state which presents a predetermined resistance R (again, typically 600 ohms resistance) to the transmission path. In accordance with the present invention, a plurality of separate and substantially identical multi-pole low-pass filters are provided for connection between the transmission path and respective ones of the telephone sets, where each of the low-pass filters has a −3 dB frequency $f_2$ (typically 10 kHz) which lies between $f_1$ and $f_3$, and a characteristic impedance of substantially (n*R), where n is a number equal to at least 2.4, thereby reducing the effect of low impedances that develop at frequencies below $f_1$ because of resonances that occur between $f_1$ and $f_2$ with at least one but less than all of said telephone sets off-hook.

Further in accordance with the invention, where each filter has an even number of poles, an inductive side is connected to the transmission path and a capacitive side is connected to a telephone set. Where each filter has an odd number of poles, an inductive side is connected to the transmission path, an inductive side is connected to a telephone set, and capacitive elements are interior to the filter. Such arrangements are necessary in order to prevent capacitive filter elements from short-circuiting high frequency components of data signals.

Still further in accordance with the invention, in each low-pass filter, when compared to the same filter designed for a characteristic impedance of 1 ohm resistance and a −3 dB frequency of 1 radian per second, all inductors are scaled by the expression:

$$(n*R)/(2\pi*f_2) \qquad (1)$$

and all capacitors are scaled by the expression:

$$1/(2\pi*f_2*n*R). \qquad (2)$$

Still further in accordance with the invention, each of the filters is a Butterworth filter which is balanced with respect to ground. Such balance matches the characteristics of most wire distribution lines in the telephone subscriber loop plant.

The invention may be more fully understood from the following detailed description of specific examples, considered in the light of the accompanying drawings and the appended claims.

DETAILED DESCRIPTION

Figure 1:
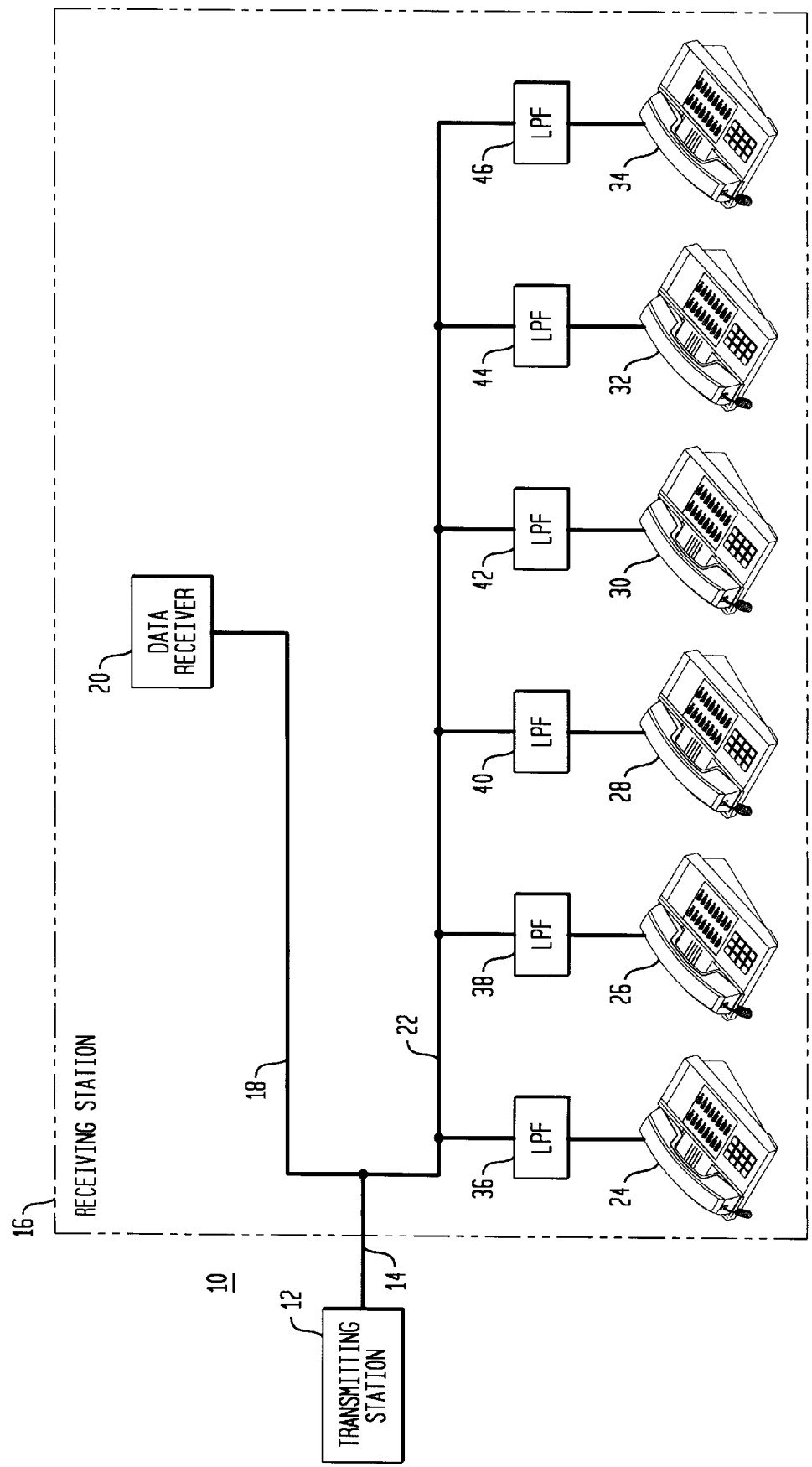
FIG. 1 is a block diagram of a telephone subscriber loop transmission system illustrating the context of the present invention.

FIG. 1 is a block diagram of a portion 10 of a subscriber loop plant which includes a telephone central office 12 (labeled Transmitting Station in FIG. 1), a metallic balanced two-wire transmission path or loop 14, and a remote station 16 (labeled Receiving Station in FIG. 1). Within subscriber premises at remote station 16 are a two-wire distribution line 18 leading from transmission path 14 to a data set 20 (labelled Data Receiver in FIG. 1) and a two-wire distribution line 22 leading from transmission paths 14 to a plurality of POTS telephone sets 24, 26, 28, 30, 32, and 34. Distribution line 18 need not necessarily be separate and distinct from distribution line 22. Although six POTS telephone sets are illustrated, they may total any number, depending upon the needs of the subscriber. To separate voice frequency POTS telephone signals from data signals, a plurality of low-pass filters (LPFs) 36, 38, 40, 42, 44, and 46 are connected between distribution line 22 and respective ones of telephone sets 24, 26, 28, 30, 32, and 34.

In the example illustrated in FIG. 1, data service takes the form of ADSL (Asymmetrical Digital Subscriber Line) service, which was developed to allow simultaneous use of a twisted pair telephone loop for POTS and ADSL service. ADSL permits a telephone operating company to offer simultaneous high-speed (up to 8 Mb/s) data access to a subscriber without having to provide an additional loop. A brief explanation of ADSL follows.

ADSL and its Universal variant UDSL use tones spaced 4.3125 (4 5/16) kHz apart. Each is modulated at a 4.0588 (4 1/17) kbaud rate with a binary constellation of points. The system adds an overhead of one byte for each 68 bytes transmitted, which gives 4 kbaud of user data plus 1/17 kbaud of overhead. Thus, when modulated with a 4-point constellation (the minimum) it is 4 QAM (Quadrature Amplitude Modulation) modulation and each symbol carries 2 bits (log2(4)) of user data for a capacity of 8 kb/s of user data for that tone.

Modulation can go up as high as 256 QAM, with 16 points along each axis (256 distinct points) for 8 bits per symbol, or a total user bit rate for that tone of 32 kb/s=4 kbaud*log2 (256). Modulation with even higher numbers of points is currently under consideration by some standards bodies.

At startup, each tone band is analyzed to determine the signal to noise ratio (SNR) and assigned individually a number of points (0, 4, 8, 16, 32, 64, 128, 256) appropriate to the SNR for that tone band. One of the choices is zero, which is appropriate if, for example, the tone is on the same frequency as a local radio transmitter.

Tones run from 0 to 256, which gives a lowest tone of 0 Hz and a highest tone of 1104 kHz. Tones below 6 (25.875 kHz) are not used as they would interfere with POTS telephony. Tones 0 and 256 cannot be used for data easily for reasons related to the nature of Fourier Transforms, so potentially 1–255 are usable, and 6–255 are used for full ADSL.

For UDSL, a further limitation is imposed to make the equipment cheaper. Tones above 128 are eliminated to decrease the expense and power demand of the analog to digital (A/D) and digital to analog (D/A) devices and signal processing on both ends. For UDSL there is very little penalty for this, as the upper tones are not useful on long loops.

Another reduction in tone use for UDSL only is that tones 6–31 are used only for upstream transmission (subscriber to central office) and downstream (central office to subscriber) is limited to 33 and above (tones 32 and 16 are reserved for administrative purposes). This is done to eliminate need for echo-cancellation, a good but expensive technique where tones can be used in both directions simultaneously. The reasons for eliminating echo-cancellation are economics, and the catastrophic effect on echo cancellation systems by POTS telephone sets going on and off hook without POTS splitters to isolate them.

For an installation like that in FIG. 1, but without the low-pass filters, it is known that a device known as a "POTS splitter" may be installed on the exterior of the subscriber premises by the telephone company. The purpose of this POTS splitter (not shown) is to direct the POTS signal onto the existing internal wiring (pair 22) and the ADSL signal onto a second and possibly new inside pair 18. The splitter is a passive filter-type device which operates by sending low frequencies (below about 10 kHz) to the POTS wiring 22 within the subscriber premises and the high frequencies (above about 10 kHz) to the ADSL wiring 18. Thus, the ADSL signal, which exists almost entirely above 24 kHz, does not appear at and is not affected by the POTS telephone sets 24–34, and the POTS signals, which only use frequencies below 4 kHz, do not appear at and are not affected by the ADSL modem signals.

Telephone company experience (primarily with ISDN—Integrated Services Digital Network) suggests that a need to send a vehicle and a technician to install the splitter may be both an unacceptable expense and a possible barrier to the provision of data service.

An alternative is to provide low-pass filters which can be obtained by the subscriber and installed by the subscriber at each telephone set in the manner illustrated in FIG. 1. Initially, it might appear that simple low-pass filters, installed between distribution loop 22 and respective telephone sets 24–34, would achieve the desired result. There is a major difficulty, however, when multiple telephone sets (extensions) are installed on the same subscriber premises.

Filters are designed to provide a particular frequency-domain response when a single filter is connected between one source and one load, both having specified impedances matching the characteristic impedances of the filter. This is the architecture for all "normal" uses of filters. When more than one source or more than one load is to be served, devices known as "multi-port splitters" are used to adapt the impedance of multiple sources or loads to the characteristic impedance of the filter. Each multi-port splitter has a specific number of inputs and outputs and each must be properly terminated—none can be left "open circuited."

Thus, in accordance with the teachings of the prior art, either a frequency splitter needs to be applied at the entrance to the subscriber premises to separate the high and low frequencies onto different paths to provide both ADSL and POTS service, or some arrangement with multiple filters in parallel needs to be attempted.

The most straight-forward way to provide filters that work properly when tied in parallel and are misterminated is to limit each filter to a single series inductor (a 1-pole filter). With this approach, there are no shunt capacitors to degrade transmission in the POTS frequency band, and the addition of misterminated filters in parallel does not degrade the POTS signal beyond the degradation caused by a single filter.

Unfortunately, single-pole filters are limited to only a −6 dB/octave slope, and the separation between the top of the POTS frequency band at 4 kHz and the bottom of the ADSL frequency band at 24 kHz allows only about 16 dB of attenuation at the bottom of the ADSL band, and about 24 dB when integrated over the entire ADSL band, even when the POTS telephone signal is degraded to a return loss of only 3 dB by the filter. This, however, is not enough ADSL attenuation, given the high levels used for ADSL transmission and the sensitivity of typical POTS telephone sets to high-frequency signals. The 3 dB POTS return loss also represents a very severe degradation of POTS transmission even when no ADSL signal is present.

Another approach suggested by the prior art is to use multi-pole filters, which provide a steeper slope of attenuation versus frequency. Such filters provide acceptable attenuation of ADSL energy into a POTS telephone set and acceptable POTS transmission when there is only a single such filter. As additional filters are added, however, both the POTS response and the attenuation of the ADSL signal into the telephone sets degrade due to spurious response caused by unterminated filters on the on-hook extension telephone sets. This is not surprising, as such a multi-filter approach violates the basic assumptions of standard filter-synthesis theory by connecting an unknown number of misterminated filters in parallel.

Figure 2:
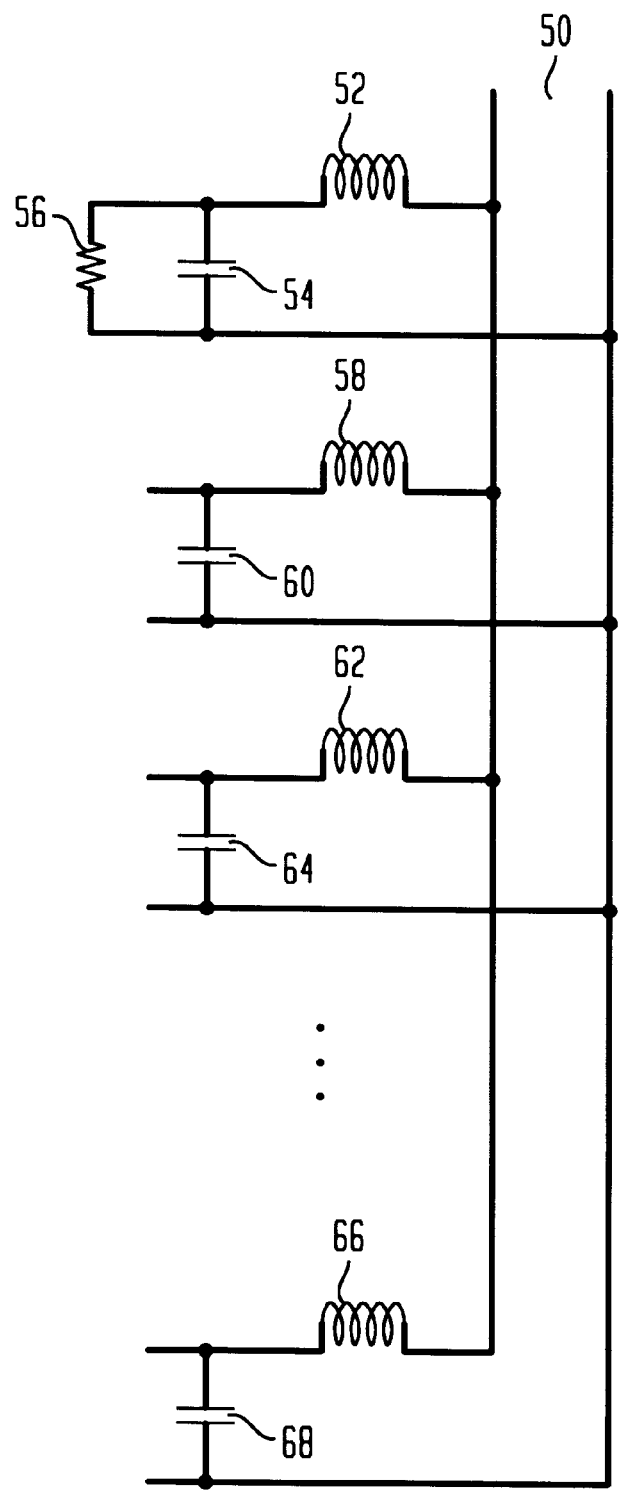
FIG. 2 illustrates what happens in a prior art arrangement when fewer than all telephone sets on the same subscriber premises in the transmission system are on the off-hook condition.

An appreciation of the true source of the problem can be obtained from FIG. 2, where telephone line, telephone, and filters are shown in equivalent single-ended (unbalanced) form for clarity.

In FIG. 2, which represents prior art knowledge, a two-wire transmission line 50 (unbalanced for the purpose of illustration) carries POTS signals from a telephone central office. A first two-pole low-pass filter consisting of a series inductor 52 and a shunt capacitor 54 is connected across line 50. This first filter is terminated by a resistor 56, representing the impedance of an off-hook telephone set. A second two-pole low-pass filter consisting of a series inductor 58 and a shunt capacitor 60, a third two-pole low-pass filter consisting of a series inductor 62 and a shunt capacitor 64, and a fourth two-pole low-pass filter consisting of a series inductor 66 and a shunt capacitor 68 are similarly connected across line 50. The second, third, and fourth filters are all shown unterminated, as they would be if connected to on-hook telephone sets.

Each of the unterminated filters in FIG. 2 appears as a series inductance and capacitance across the line 50. With both 2-pole and 3-pole filters, the series resonant frequency of this combination is equal to the square root of 2 times the −3 dB cutoff frequency of the filter. At this frequency, the impedance shunting the loop is zero, and transmission is impossible.

Also at frequencies near the zero-impedance frequency, the impedance of the series circuit is very low. This is true because the reactances of the inductor and capacitor are opposite in sign (by convention the capacitor reactance is taken as negative and that of the inductor is taken as positive) and they subtract. Since the reactance of the inductor increases linearly with frequency, and the reactance of the capacitor decreases as the inverse of frequency, at half of the resonant frequency the impedance is still (2−0.5) or 1.5 times the impedance of each element at the resonance. Thus this shunt affects transmission down to very low frequencies. In the limit, at zero frequency, the shunt impedance appears to be just that of the capacitor.

As the subscriber wires up more extensions, and more filters are added in parallel in the arrangement illustrated in FIG. 2, the impedance decreases as 1/N, where N is the number of extensions. By the time 7 extensions are reached, the shunt impedance for any reasonable choice of filter cutoff frequency is very low even at 4 kHz, leading to a very poor return loss at the top end of the POTS band.

This poor return loss can be improved by raising the cutoff frequency of the filter by proportionally decreasing the values of L and C, where L is the inductance of the series inductor and C is the capacitance of the shunt capacitor, but this also decreases the attenuation of the unwanted ADSL signal at the telephone sets. Also, if carried too far, the zero-impedance frequence is moved closer to, or even into, the ADSL band, degrading ADSL performance. Thus, there is an unavoidable relationship between POTS return loss, ADSL attenuation achieved, and the number of filters, with overall performance degrading rapidly as the number of filters is increased.

Figure 3A:
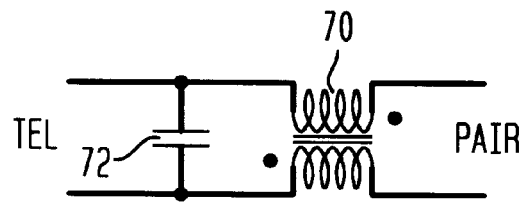
FIGS. 3A through 3D, illustrate balanced multi-pole Butterworth filters which, with characteristic impedances equal to at least (2.4*R), represent specific embodiments of the present invention.
Figure 3B:
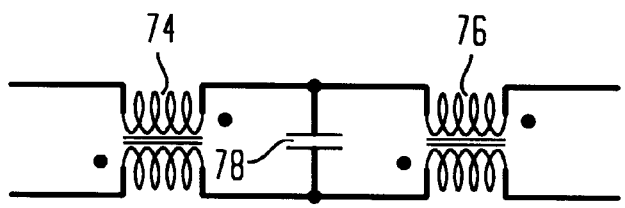
Figure 3C:
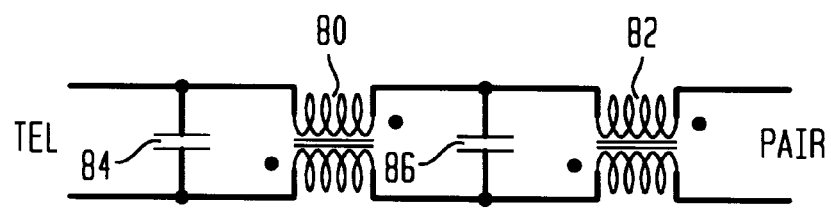
Figure 3D:
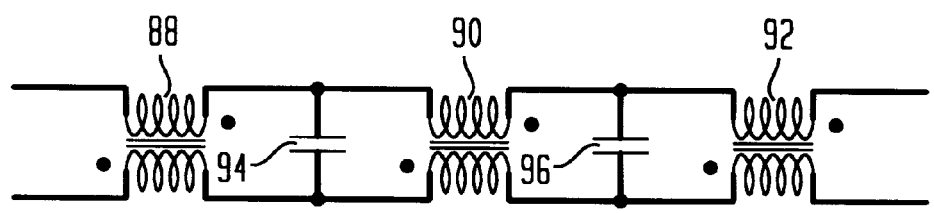

FIGS. 3A, 3B, 3C, and 3D illustrate multi-pole balanced Butterworth filters which may be used, in accordance with the invention, to solve the problems presented by unterminated filters in the context of FIG. 1. FIG. 3A illustrates a two-pole filter consisting of a series inductor 70 and a shunt capacitor 72, FIG. 3B illustrates a three-pole filter consisting of two series inductors 74 and 76 plus a shunt capacitor 78, FIG. 3C illustrates a four-pole filter consisting of two series inductors 80 and 82 plus two shunt capacitors 84 and 86, and FIG. 3D illustrates a five-pole filter consisting of three series inductors 88, 90, and 92 plus two shunt capacitors 94 and 96. Higher numbers of poles may be obtained by extending the examples shown in FIGS. 3A, 3B, 3C, and 3D.

In the two-pole filter shown in FIG. 3A, capacitor 72 is in an exterior leg on the left, requiring the left hand side of the filter to be connected to the telephone set and the right hand side to be connected to the pair. In the three-pole filter shown in FIG. 3B, capacitor 78 is internal to the filter, so either side of the filter may be connected to the telephone set or the pair. In the four-pole filter shown in FIG. 3C, capacitor 84 is in an exterior leg on the left, requiring the left hand side of the filter to be connected to the telephone set and the right hand side to be connected to the pair. In the five-pole filter shown in FIG. 3D, capacitors 94 and 96 are both internal to the filter, so either side of the filter may be connected to the telephone set or the pair. Thus, when the filter has an even number of poles, either side may be connected to the telephone set. When the filter has an odd number of poles, the side containing the capacitor is connected to the telephone set and the other side is connected to the pair.

Filters are classified by the mathematical polynomial used for their design, and by the number of poles and zeros defining polynomials.

The most common functions used for low-pass filter design are Butterworth, Chebyshev, and Elliptic-Function polynomials. The rationale used to derive each is roughly as follows:

Butterworth. Low frequencies are the most important. The attenuation should be zero at zero frequency and should always increase smoothly with frequency. All zeros are at infinite frequency, and therefore do not enter the design criteria.

Chebyshev. All frequencies in the passband are equally important, and a specified amount of passband ripple is acceptable. Attenuation should always increase with frequency above the top of the passband. All zeros are at infinite frequency, and therefore do not enter the design criteria.

Elliptic-Function. All frequencies in the passband are equally important, and a specified amount of ripple is acceptable. The attenuation should increase as fast as possible above the top of the passband, but may reach a maximum after some point and rebound to lower values. Zeros are located in the stopband at finite frequencies, and are used to get a quick rolloff.

For LC (inductor capacitor) filters with real-valued components (the only kind that can be built with passive devices) the number of poles and zeros must be equal or differ by one, and the number of reactive components (inductors plus capacitors) is equal to the sum of the two (not counting those located at infinity). Thus, a 2-pole low-pass filter with all zeros at infinity requires two reactive components, a 3-pole low-pass filter requires 3 reactive components, and so on. Elliptic-Function filters are less desirable when this is considered, as they have zeros not at infinity and thus more component parts.

The present invention is particularly applicable to Butterworth filters without being limited to them, as these have the lowest values of Q (the ratio of reactance to resistance) for a given design and do not introduce ripple into the passband when terminated in their characteristic impedances at both ends). Butterworth filters also have the lowest delay distortion (non-constant delay with frequency) of the three types.

The purpose of filters with more poles is to get the maximum attenuation above the cutoff frequency, and the least attenuation below it. The formula for the attenuation A in dB at a frequency f of an N-pole Butterworth filter with a −3 dB (actually −3.0103 dB) cutoff frequency of $f_2$ is:

$$A = 10 * \text{Log}\ (1 + (f/f_2)*2N) \quad (3)$$

The following table evaluates this formula for 2 through 5-pole Butterworth filters, giving attenuation in dB for a number of different frequencies:

| Frequency | 2-Pole dB | 3-Pole dB | 4-Pole dB | 5-Pole dB |
|---|---|---|---|---|
| 0 | 0.00 | 0.00 | 0.00 | 0.00 |
| 0.05 | 0.00 | 0.00 | 0.00 | 0.00 |
| 0.10 | 0.00 | 0.00 | 0.00 | 0.00 |
| 0.15 | 0.00 | 0.00 | 0.00 | 0.00 |
| 0.20 | 0.01 | 0.00 | 0.00 | 0.00 |
| 0.25 | 0.02 | 0.00 | 0.00 | 0.00 |
| 0.30 | 0.04 | 0.00 | 0.00 | 0.00 |
| 0.35 | 0.06 | 0.01 | 0.00 | 0.00 |
| 0.40 | 0.11 | 0.02 | 0.00 | 0.00 |
| 0.45 | 0.17 | 0.04 | 0.01 | 0.00 |
| 0.50 | 0.26 | 0.07 | 0.02 | 0.00 |
| 0.60 | 0.53 | 0.20 | 0.07 | 0.03 |
| 0.70 | 0.93 | 0.48 | 0.24 | 0.12 |
| 0.80 | 1.49 | 1.01 | 0.67 | 0.44 |
| 0.90 | 2.19 | 1.85 | 1.55 | 1.30 |
| 1.00 | 3.01 | 3.01 | 3.01 | 3.01 |
| 1.25 | 5.37 | 6.83 | 8.43 | 10.13 |
| 1.50 | 7.83 | 10.93 | 14.25 | 17.68 |
| 1.75 | 10.16 | 14.73 | 19.49 | 24.32 |
| 2.00 | 12.30 | 18.13 | 24.10 | 30.11 |
| 2.50 | 16.03 | 23.89 | 31.84 | 39.79 |
| 3.00 | 19.14 | 28.63 | 38.17 | 47.71 |
| 4.00 | 24.10 | 36.12 | 48.16 | 60.21 |
| 5.00 | 27.97 | 41.94 | 55.92 | 69.90 |
| 6.00 | 31.13 | 46.69 | 62.25 | 77.82 |
| 8.00 | 36.12 | 54.19 | 72.25 | 90.31 |
| 10.00 | 40.00 | 60.00 | 80.00 | 100.00 |

The topology of 2 through 5-pole "T-section" Butterworth filters is shown in FIGS. 3A, 3B, 3C, and 3D. Note that those with an even number of poles require a particular orientation with respect to the telephone set and the distribution pair, since the transmission path should not be shunted with a capacitor. Filters with odd numbers of poles are implemented with inductors on both ends, so that orientation is not important.

There is an advantage to filters with even numbers of poles. Because they place a capacitor across the telephone set, dial pulsing and on-hook do not directly interrupt the current through an inductor. This should help minimize these transients, and may by itself be a good reason to prefer this arrangement.

An obvious disadvantage to filters with even numbers of poles is that the filters must be clearly marked so that the subscriber will not plug them in backwards. For example, if the filter were designed to plug into the wall-jack, one wouldn't want the subscriber to plug it into the telephone set instead. Since the filter would have a male connector on one side and a female connector on the other, it would fit and the physical connectivity would work either way, but only one way is electrically correct.

To scale filters in accordance with the invention to realistic frequencies and characteristic impedances, assuming that $f_2$ is the desired −3 dB frequency in Hertz and $(n*R)$ is the desired characteristic impedance on each end, where R is the resistance of an off-hook telephone set and n is a number of substantially 2.4 (actually 1+the square root of 2) or larger: Multiply all inductor values by $$(n*R)/(2*\pi*f_2) \quad (4)$$

Multiply all capacitor values by $$1/(2*\pi*f_2*n*R) \quad (5)$$

Two complicating factors should be kept firmly in mind during any discussion of POTS filters:
1. Filters do not work to specification when they are not terminated with their characteristic impedances.
2. Filters do not work to specification when multiple filters are connected in parallel.

Unfortunately, the present application involves both of these factors. On-hook POTS telephone sets present a very high terminating impedance to the filter, and multiple POTS telephone sets on a line will result in multiple POTS filters connected in parallel across the line when one or more of them remain on-hook.

Although the input impedance of filters is well-behaved when they are properly terminated in their characteristic impedances, it goes wildly out of control when they are terminated by an open circuit. In particular, simple calculation shows that the 2-pole filter illustrated in FIG. 3A, when terminated on the telephone side by an open circuit (telephone set on-hook) has an input impedance of zero at 0.707 times the −3 dB frequency, where the inductor and capacitor have equal and opposite reactance and are series-resonant.

This property is not unique to 2-pole filters, but applies to all filters with more than one pole. As the number of poles increases, the frequency of the first unterminated impedance zero decreases and there are more of them, with the total number being half the number of filter poles, and all are below the −3 dB frequency.

Even a single pole (inductor only) filter is not immune to this. At some frequency, the input to the telephone will appear capacitive and will resonate with the single inductor, producing a zero of input impedance at that poorly-defined frequency. Indeed, the 2-pole arrangement at least gives some assurance that the frequency of this zero is understood and not primarily dictated by unknown stray inductances and capacitances.

At the low-frequency limit, each filter looks like a capacitor connected across the transmission path. The effective value of this capacitor is larger as the frequency being analyzed approaches the zero-impedance frequency. Assuming that all of the zero-impedance frequencies lie well above the POTS band, and the zero-impedance frequency is $f_z$, the POTS frequency of interest is $f_p$, the total capacitance of each filter is $C_f$, and the number of filters in parallel is N, then to a reasonable approximation:

$$C_{effective} = (N * C_f * f_z)/(f_z - f_p) \text{ for } f_p < f_z \qquad (6)$$

There are three instances where this could be significant. The first is during POTS on-hook transmission, when the POTS filter is mis-terminated by the on-hook telephone, and reflects the impedance mismatch to the device(s) during the on-hook transmission, causing a non-flat frequency response.

The second instance is where there is more than one POTS telephone with a filter installed on the subscriber premises, and fewer than all of the telephone sets are in use.

The −3 dB frequency must thus be chosen carefully, so that the zero impedance "suck-out" due to on-hook telephones with filters is well above the POTS band and well below the UDSL band. Note, however, that multiple telephone sets off hook in itself represents a POTS transmission impairment, and additional degradation due to mis-terminated filters is relatively small compared to this.

Figure 4:
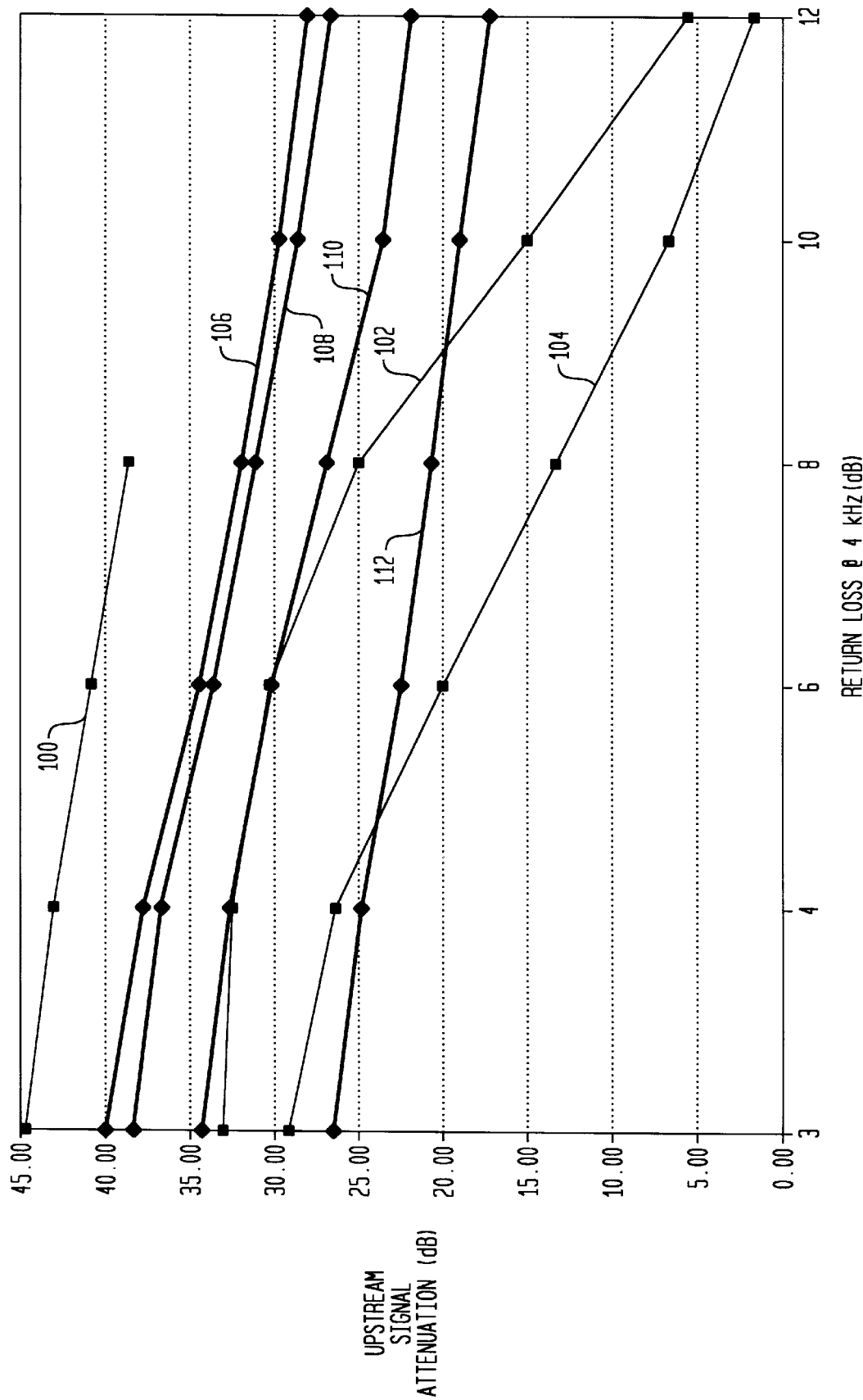
FIG. 4 is a graph illustrating upstream signal attenuation versus return loss at 4 kHz for both the prior art approach and employment of the present invention.

FIG. 4 is a graph illustrating the advantage the present invention exhibits over known prior art approaches using parallel filters. In the graph the ordinate represents attenuation of the upstream (subscriber to central office) ADSL or UDSL signal toward the POTS telephone protected by a filter, with attenuation in dB. The abscissa represents return loss at 4 kHz in dB. Each point on a particular curve at a given abscissa value represents the best (greatest) Upstream Signal Attenuation that can be achieved by a particular filter design with a minimum Return Loss at 4 kHz requirement, number of filters in parallel, and design technique indicated by the value of the particular curve chosen at that abscissa value. Curves 100, 102, 104, and 112 all represent prior art approaches using filters conventionally designed for termination by R, the impedance of an off-hook telephone receiver: curve 100 (for comparison purposes) for a single 2-pole filter with only a single telephone receiver, curve 102 for two 2-pole filters, curve 104 for three 2-pole filters, and curve 112 for any number of 1-pole filters. Curves 106, 108, and 110 all represent results obtained through use of embodiments of the invention, where each filter is designed for a terminating resistance of 4 times R, the nominal telephone impedance of 600 ohms: curve 106 (for comparison purposes) for a single 2-pole filter and a single telephone receiver, curve 108 for three 2-pole filters and two telephone receivers, and curve 110 for seven 2-pole filters and seven telephone receivers. For each curve, the assumption is that only one POTS telephone receiver is off-hook and that the rest of the filters are terminated in an open from the on-hook telephone receiver connected to each.

As shown in FIG. 4, the prior art for 2-pole filters (illustrated by curves 100, 102, and 104) gives acceptable attenuation of ADSL or UDSL into the POTS telephone when there is only a single filter (curve 100). As additional filters are added (curves 102 and 104), both the achievable attenuation of the ADSL or UDSL signal into the telephone receiver for a given minimum 4 kHz return loss degrades because of impedance degradation at 4 kHz and below caused by the unterminated filters on the on-hook telephone receivers. This should not be surprising, as such a multi-filter approach violates the basic assumptions of standard filter-synthesis theory by connecting an unknown number of misterminated filters in parallel. The prior art for 1-pole filters (illustrated by curve 112) gives a consistent, but much lower, attenuation of the ADSL or UDSL signal into the telephone receiver.

Curves 106, 108, and 110 in FIG. 4 show the advantages afforded by the present invention, where each filter is intentionally mismatched to the off-hook telephone receivers. Curves 106, 108, and 110 all illustrate performance when filters are designed with characteristic impedances matching, not the actual 600 ohms of an off-hook telephone receiver and the loop, but 4 times that resistance or 2400 ohms. When the design impedance of the filter is multiplied by 4, all of the inductor values are multiplied by 4 and the capacitor values are divided by 4. The multiplier value may be further optimized for any given maximum number of parallel filters, but it is apparent that 4 works very well for any number of parallel filters from 1 through 7.

As can be seen in FIG. 4, it is obvious that dividing the capacitor values by 4 has an immediate effect on the shunt capacitance, which is reduced by a factor of 4 at the low-frequency limit, other parameters being equal. This is part of the benefit provided by the invention. Another part of the benefit arises because the inductor values are multiplied by 4. This forces the filter to appear to be a 1-pole filter in the first part of the stop-band and to transition gradually to a 2-pole effective response at higher frequencies. Thus the filter has somewhat reduced attenuation at the lowest ADSL or UDSL frequency similar to that provided by a 1-pole filter, but quickly rolls off above that, giving a higher effective attenuation when integrated over the entire ADSL or UDSL upstream band.

It is to be understood that the embodiments of the invention which have been described are illustrative. Numerous other arrangements and modifications may be readily devised by those skilled in the art without departing from the spirit and scope of the invention.

What is claimed is:

1. In a transmission system which includes a transmission path from a transmitting station to a receiving station for both voice telephone service occupying the frequency spectrum below a predetermined frequency $f_1$ and for data service occupying the frequency spectrum above another predetermined frequency $f_3$, where $f_3$ is substantially higher than $f_1$, a plurality of telephone sets at said receiving station connected in parallel with one another to said transmission path, and where each of said telephone sets has an on-hook state which presents a substantially infinite resistance to said transmission path and an off-hook state which presents a predetermined resistance R to said transmission path:

a plurality of separate and substantially identical multipole low-pass filters connectable between said transmission path and respective ones of said telephone sets, where each of said low-pass filters has a −3 dB frequency $f_2$ which lies between $f_1$ and $f_3$, and a characteristic impedance of substantially (n*R), where n is a number equal to at least 2.4, thereby reducing the effect of low impedances that develop at frequencies below $f_1$ because of resonances that occur between $f_1$ and $f_2$ with at least one but less than all of said telephone sets off-hook.

2. The filters of claim 1 in which each of said filters has an even number of poles, an inductive side for connection to said transmission path, and a capacitive side for connection to a respective one of said telephone sets.

3. The filters of claim 1 in which each of said filters has an odd number of poles, an inductive side for connection to said transmission path, an inductive side for connection to a respective one of said telephone sets, and capacitor containing elements interior to the filter between said inductive sides.

4. The filters of claim 1 in which, in each filter, when compared to the same filter designed for a characteristic impedance of 1 ohm resistance and a −3 dB frequency of 1 radian per second, all inductors are scaled by the expression:

$$(n*R)/(2*f_2)$$

and all capacitors are scaled by the expression:

$$1/(2\pi*f_2*n*R).$$

5. The filters of claim 4 in which each of said filters is an m pole Butterworth filter, where m is an integer greater than 1, and each of said filters is balanced with respect to ground.

6. The filters of claim 5 in which each of said filters is a 2-pole Butterworth filter, and each of said filters is balanced with respect to ground.

7. The filters of claim 4 in which each of said filters has an even number of poles, an inductive side for connection to said transmission path, and a capacitive side for connection to a respective one of said telephone sets.

8. The filters of claim 4 in which each of said filters has an odd number of poles, an inductive side for connection to said transmission path, an inductive side for connection to a respective one of said telephone sets, and capacitor containing elements interior to the filter between said inductive sides.

9. The filters of claim 4 in which $f_1$ is substantially equal to 4 kHz, $f_2$ is substantially equal to 10 kHz, and $f_3$ is substantially equal to 24 kHz.

10. Filter apparatus for use in a transmission system which comprises a transmission path from a transmitting station to a receiving station for both voice telephone service occupying the frequency spectrum below a predetermined frequency $f_1$ and for data service occupying the frequency spectrum above another predetermined frequency $f_3$, where $f_3$ is substantially higher than $f_1$, and a plurality of telephone sets at said receiving station connected in parallel with one another to said transmission path, where each of said telephone sets has an on-hook state which presents a substantially infinite resistance to said transmission path and an off-hook state which presents a predetermined resistance R to said transmission path, said filter apparatus comprising:

a plurality of separate and substantially identical multipole low-pass filters for connection between said transmission path and respective ones of said telephone sets, where each of said low-pass filters has a −3 dB frequency $f_2$ which lies between $f_1$ and $f_3$, and a characteristic impedance of substantially (n*R), and where n is a number equal to at least 2.4, thereby reducing the effect of low impedances that develop in said filters at frequencies below $f_1$ because of resonances occurring between $f_1$ and $f_2$ with at least one but less than all of said telephone sets off-hook.

11. The filter apparatus of claim 10 in which each of said filters has an even number of poles, an inductive side for connection to said transmission path, and a capacitive side for connection to a respective one of said telephone sets.

12. The filter apparatus of claim 10 in which each of said filters has an odd number of poles, an inductive side for connection to said transmission path, an inductive side for connection to a respective one of said telephone sets, and capacitor containing elements interior to the filter between said inductive sides.

13. The filter apparatus of claim 10 in which, in each filter, when compared to the same filter designed for a characteristic impedance of 1 ohm resistance and a −3 dB frequency of 1 radian per second, all inductors are scaled by the expression:

$$(n*R)/(2\pi*f_2)$$

and all capacitors are scaled by the expression:

$$1/(2\pi*f_2*n*R).$$

14. The filter apparatus of claim 13 in which each of said filters is an m pole Butterworth filter, where m is an integer greater than 1, and each of said filters is balanced with respect to ground.

15. The filter apparatus of claim 14 in which each of said filters is a 2-pole Butterworth filter, and each of said filters is balanced with respect to ground.

16. The filter apparatus of claim 13 in which each of said filters has an even number of poles, an inductive side for connection to said transmission path, and a capacitive side for connection to a respective one of said telephone sets.

17. The filter apparatus of claim 13 in which each of said filters has an odd number of poles, an inductive side for connection to said transmission path, an inductive side for connection to a respective one of said telephone sets, and capacitor containing elements interior to the filter between said inductive sides.

18. The filter apparatus of claim 13 in which $f_1$ is substantially equal to 4 kHz, $f_2$ is substantially equal to 10 kHz, and $f_3$ is substantially equal to 24 kHz.

19. A transmission system comprising:

a transmission path from a transmitting station to a receiving station for both voice telephone service occupying the frequency spectrum below a predetermined frequency $f_1$ and for data service occupying the frequency spectrum above another predetermined frequency $f_3$, where $f_3$ is substantially higher than $f_1$, and a plurality of telephone sets at said receiving station connected in parallel with one another to said transmission path, where each of said telephone sets has an on-hook state which presents a substantially infinite resistance to said transmission path and an off-hook state which presents a predetermined resistance R to said transmission path; and a plurality of separate and substantially identical multi-pole low-pass filters for connection between said transmission path and respective ones of said telephone sets, where each of said low-pass filters has a −3 dB frequency $f_2$ which lies between $f_1$ and $f_3$, and a characteristic impedance of substantially (n*R), and where n is a number equal to at least 2.4, thereby reducing the effect of low impedances that develop in said filters at frequencies below $f_1$ because of resonances occurring between $f_1$ and $f_2$ with at least one but less than all of said telephone sets off-hook.

* * * * *